United States Patent [19]

Volk

[11] Patent Number: 4,739,538
[45] Date of Patent: Apr. 26, 1988

[54] POSITIVE LOCKING POULTRY LEG RETAINER

[75] Inventor: Anthony J. Volk, Turlock, Calif.

[73] Assignee: Volk Development Company, Turlock, Calif.

[21] Appl. No.: 41,975

[22] Filed: Apr. 24, 1987

[51] Int. Cl.⁴ .............................................. A22C 21/00
[52] U.S. Cl. .......................................... 17/11; 17/1 S; 17/44.1
[58] Field of Search ..................................... 17/1 S, 11

[56] References Cited

U.S. PATENT DOCUMENTS

| | | | |
|---|---|---|---|
| 3,507,003 | 4/1970 | Shadley | 17/44.1 |
| 4,051,573 | 10/1977 | Volk | 17/1 S X |
| 4,653,146 | 3/1987 | Volk | 17/11 |

Primary Examiner—Willie G. Abercrombie
Attorney, Agent, or Firm—Alvin E. Hendricson

[57] ABSTRACT

The present invention provides a unitary flexible retainer for holding the legs of eviscerated poultry tightly against the body of the fowl over the rear body opening and includes a central locking member cooperating with straps for positively securing the poultry legs tightly against each of the hocks thereof, together with anchors into kidney openings in the poultry backbone.

7 Claims, 1 Drawing Sheet

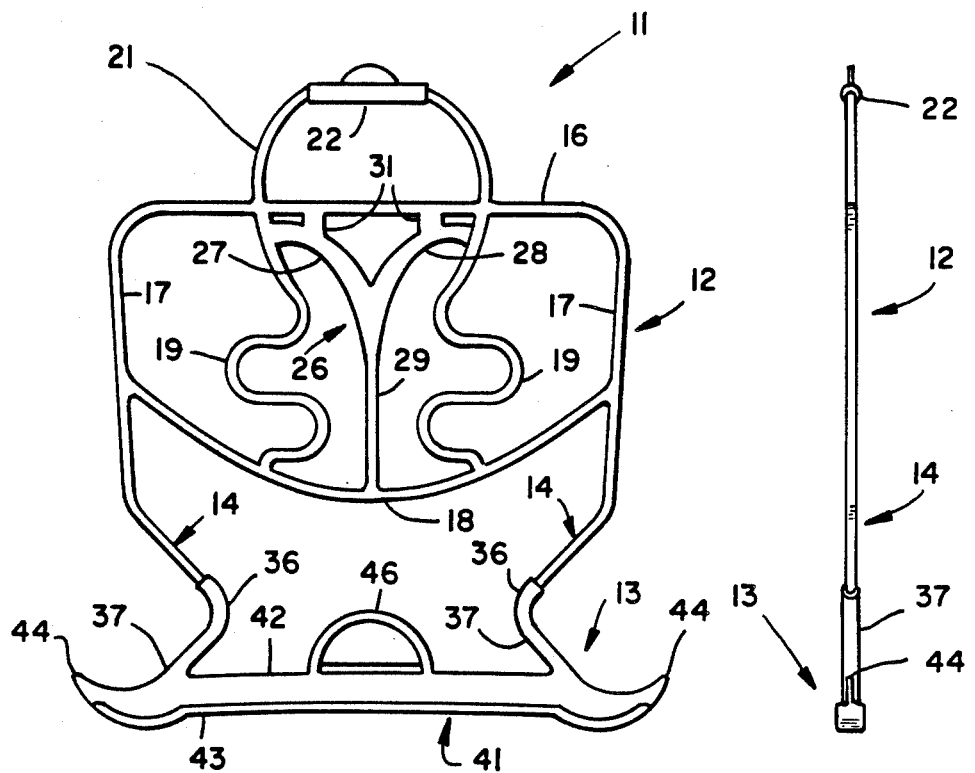
FIG_1    FIG_2
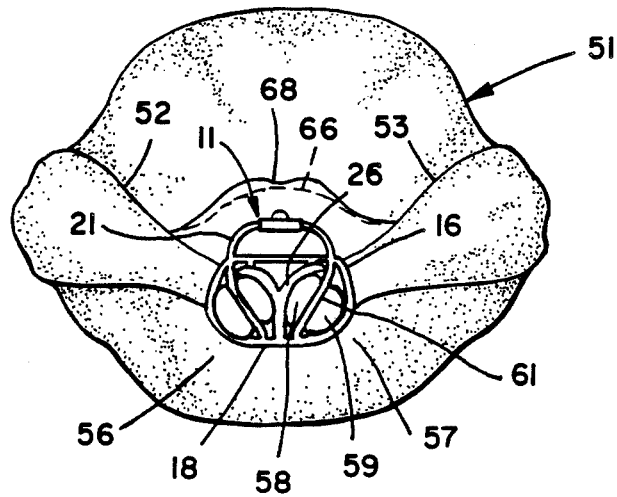
FIG_3

POSITIVE LOCKING POULTRY LEG RETAINER

The present invention provides a unitary, limitedly flexible poultry leg retainer of the general type shown, for example, in my U.S. Pat. No. 4,615,075 and further includes a central locking member for preventing undesired inward movement of trussed poultry legs during processing or the like.

BACKGROUND OF INVENTION

Trussing of poultry for cooking may be accomplished with strings or various types of retainers that hold the legs of eviscerated poultry against the body over the rear body opening. U.S. Pat. No. 3,112,515 shows a widely employed poultry leg retainer and improvements thereon are shown in U.S. Pat. Nos. 3,895,415, 4,051,573 and 4,615,075 and reference is made to these patents and the references cited therein for an identification of the state of the art.

It has been found that under certain circumstances of poultry processing, such as freezing, it is possible for the poultry to strike processing apparatus in such a manner that one of the legs held in place by a retainer may be forced inwardly of the body to unseat the hock thereof from the retainer so that it is necessary to reseat the leg in the retainer. The present invention provides an improvement in poultry leg retainers, particularly of the type shown in my U.S. Pat. No. 4,615,075, for firmly locking poultry legs in desired position despite blows to the legs that might otherwise unseat a leg from the retainer.

SUMMARY OF INVENTION

The present invention comprise an integral unit preferably formed as by injection molding from nylon or other inert material that has a limited resilient flexibility. In common with my prior retainers disclosed in the above-noted patents, the present poultry retainer has depending legs that are arranged to hook, in one manner or another, into the kidney holes in the backbone structure of poultry to anchor the retainer. Above this anchor there is provided a relatively conventional "bridle" of thin straps of nylon or the like arranged to fit about and over the hocks of poultry legs. In addition to the foregoing, the present invention provides a rigid V-shaped element of substantial structural strength in the center of the retainer hereof that is disposed to engage the inner sides of the hocks behind the knuckles thereof. This structure firmly locks the hocks from movement inwardly of the body of fowl to possibly unseat the retainer whereby one of the legs would no longer is firmly retained. As previously noted, blows to the legs of poultry having a retainer may cause one of the legs of the fowl to be displaced inwardly of the body of the fowl so that the leg would not be trussed and might then extend outwardly from the body. The structure of the present invention prevents this possible mishap.

BRIEF DESCRIPTION OF DRAWINGS

The present invention is illustrated with respect to a preferred embodiment thereof in the accompanying drawing wherein:

FIG. 1 is a plan view of a poultry retainer in accordance with the present invention;

FIG. 2 is an end view of the retainer of FIG. 1; and

FIG. 3 is a rear end view of an eviscerated fowl with the retainer of the present invention in place.

DESCRIPTION OF PREFERRED EMBODIMENT

The present invention provides an improved retainer or trussing devices for the legs of eviscerated poultry particularly by the provision a central semi-rigid locking member adapted to fit partially about and between the hocks of poultry legs. The present invention is preferably formed as a single intergral unit of nylon or the like which may be readily produced by standard plastic injection molding techniques. Various aspects of the retainer of the present invention may be the same as portions of the retainer of my U.S. Pat. No. 4,615,075 and reference is made thereto for further discussion of same and particularly the lower or beam portion of the retainer hereof and attachement of same to the poultry body.

Referring now to FIGS. 1 and 2 of the drawings it will be seen that the retainer 11 hereof includes an upper bridle portion 12 particularly formed of thin strips or straps of limitedly resilient material such as nylon connected to a lower intergral beam portion 13 by a pair of resiliently extensible legs 14. Considering the bridle portion of the retainer, it will be seen that same includes and upper transverse strip or member 16 having downturned ends merging into vertical strips 17 that extend downwardly and merge into the upper ends of the legs 14. A lower strip or member 18 extends between the vertical strips 17 in an arc that is concave with respect to the upper strip 16. The bridle 12 also includes a pair of resiliently extensible strips or straps 19 extending downwardly from the upper member 16 in spaced relationship to each other and merging into the lower strip or member 18, all between the side elements 17. The straps 19 are formed with a convoluted configuration in the plane of FIG. 1 as mirror images and each includes a number of bends as illustrated so that these straps are capable of resilient elongation by straightening the curved portions thereof. The purpose of this convoluted configuration will become apparent from the following description of attachment of the retainer hereof to the hocks of poultry.

Atop the bridle 12 there is provided a semicircular ring 21 with a stiffened portion 22 extending across the top thereof to form a finger hold for gripping the retainer hereof during application and removal of the retainer from the legs of poultry. The upper stiffened portion 22 of ring 21 may be formed as rod of greater diameter than the straps of the ring, as illustrated, in order to prevent collapsing of the ring about the finger of the person pulling upwardly on the ring during insertion and/or removal of the retainer.

As an added portion of the bridle there is provided by the present invention a central locking member 26 extending from the upper strip 16 to the lower strip 18 between the straps 19 of the bridle. This locking member 26 may be formed of a pair of upper curved arms 27 and 28 joined to the upper strip 16 adjacent the strips 19 and each curving inwardly and downwardly in the shape of a flared "V" and merging into a thin vertical strip 29 extending downwardly into merging engagement with the lower strip 18 between the straps 19. The upper arms 27 and 28 of the locking member have a substantial width in the plane of FIG. 1 with such width being greater than the width of the other portions of the bridle so as to substantially preclude bending of these arms in the plane of FIG. 1. The semi-rigid nature of the upper arms 27 and 28 of the locking member are quite important to the locking feature of the present invention and it is further noted that the configuration and engagement of these uppers arms with the upper strip 16 is subject to variation. Thus, as illustrated the arms actually extend into direct merging relationship with the upper portion of the straps 19 with short vertical strips 31 joining the arms to the upper strip 16 in spaced relation to the ends of the arms. Alternatively the arms may merge directly into the strip 16 at the joinder of the straps 19 thereto.

The locking member 26 is provided to prevent inward movement of either of the hocks by pressure inwardly on the hocks. In order to accomplish this function the locking member should seat behind the hocks at the juncture of the two legs and it has been found that most positive seating is provided by curved outer sides of the locking member such as shown at the outer sides of the arms 27 and 28, although straight outer sides preferably inclined toward each other downwardly of the member may be employed. Also it is important that the locking member be relatively inflexible i.e., substantially rigid so that it cannot be inadvertantly flexed to become unseated. In this respect it is noted that the upper portion of the locking member may be solid between the outer side edges if desired, although a saving of material is achieved by the curved arm configuration illustrated.

Considering the lower portion or anchor means of the retainer thereof, it is noted that the legs 14 which depend from the side strips 17 of the bridle are inclined inwardly toward each other below the bridle and then outwardly into engagement with the beam 13 to form V-shaped knees or portions 36. The lower or outwardly inclined portions 37 of the legs 14 may have an increased or larger cross section to prevent bending of same so that these rigid lower portions improve the gripping action of the beam 13. The legs 14 may be resiliently extended by straightening the upper portion thereof.

The beam 13 is substantially inflexible and is formed of a straight central portion 41 including a generally rectangularly plate 42 with reinforcing ribs 43 along the front and back thereof at the bottom of the plate. The outer ends of the plate 42 of the beam each has an arcuate upper indentation with a depending lower arcuate configuration curving upwardly to outer points 44, with the lower ribs 43 extending along the under arcuate surfaces up to these points 44, as illustrated in FIG. 1. Atop the plate 42 between the large 14 there may be provided an upstanding tab 46 for ease of handling the retainer during insertion of same in the body of an eviscerated fowl.

The lower beam portion 13 of the present invention is substantially the same as the like portion of my retainer of U.S. Pat. No. 4,615,075 and reference is again made to this prior patent for a further discussion of the beam portion and the anchoring of same in the backbone of poultry. Suffice to say that the pointed ends 14 of the retainer hereof are adapted to be inserted into the kidney holes of the backbone of eviscerated poultry. This provides a very secure anchor for the retainer so that the upper bridle portion may be affixed about the hocks of the poultry to tightly truss same against the body of the fowl in closing relation to the rear body opening.

The retainer of the present invention is intended for use with an eviscerated fowl such as a turkey or the like, and is employed to retain the legs of such fowl tightly against the body and extending over the rear body opening with the hocks of the legs pressed together. Referring in this respect to FIG. 3, there will be seen to be schematically illustrated the eviscerated body of a turkey, for example, as shown at 51, and having legs 52 and 53 engaged by the retainer 11 of the present invention. The eviscerated turkey 51 has the feet and lower legs removed at the hocks 56 and 57 of the legs, and it will be seen that these hocks are larger than the turkey legs immediately behind same and each include a pair of knuckles 58 and 59 with a crease 61 therebetween. With the legs and 52 and 53 drawn tightly against the body of the turkey 51 at the rear end thereof, the hock creases 61 will be seen to be some what inclined with respect to vertical.

Application of the retainer 11 of the present invention to a turkey, for example, is first carried out by inserting the anchor or lower beam 13 of the retainer into the kidney holes of the backbone of the turkey through a rear body opening 66. The legs 52 and 53 of the turkey are then pressed against the body of the turkey in extension rearwardly thereof across this rear body opening and the bridle portion 12 of the retainer hereof is affixed to the hocks and behind the hocks of the turkey legs. The foregoing is accomplished by drawing the bridle up over the hocks 56 and 57 to dispose the upper strip 16 behind the hocks with the depending strips 17 extending downward behind the outer sides of the hocks and the straps 19 stretched to extend along the creases 61 between the knuckles 58 and 59 of the hocks. Additionally, the central locking member 26 is pulled over and behind the hocks and 56 and 57 so that the upper arms 27 and 28 of the locking member engage the hocks behind the knuckles thereof with the vertical strap 29 extending downward behind the hocks to the lower strip 18 which extends across the hocks behind and below the knuckles hereof. It will be seen that the upper strip 16 and depending strips 17 encircle the hocks across the top and sides thereof to resiliently pull the hocks together into the position shown in FIG. 3 with the lower strip 18 extending across the underside of the hocks below the knucles so that the hocks are in fact retained in the position illustrated wherein the hocks contact each other and hold the turkey legs 52 and 53 tightly against the body of the bird across the rear body opening 66. In addition the central locking member 26 of the retainer hereof is disposed behind the contiguous knuckles of the separate legs 52 and 53 and is seated in this position by resilient deformation of other portion of the retainer so as to prevent possible inward movement of the turkey legs.

Preceeding this attachement of the retainer to the legs of the turkey the tail 68 is preferably folded up under the legs across the rear body opening 66 to thus seal this rear body opening by pressure of the reetained legs thereon. The trussed turkey is then in condition for further processing or sale and such further processing often includes freezing of the turkey and packaging of same by a transparent skin or cover tightly molded to the exterior of the turkey. The trussed condition of the turkey legs in the above described position with the tail tucked thereunder provides a relatively smooth configuration that is well adapted to receive a plastic wrapper or the like. In use the wrapper is removed by the cook and after defrosting of a frozen turkey the tail may be removed from the illustrated position of FIG. 3 for stuffing the bird and then again tucked under the legs to seal the rear body opening to retain stuffing or filling within body cavity of the turkey. The retainer 11 may be resiliently stretched and lifted over the hocks to release the legs for stuffing the bird and then replaced in position to retain the legs. The retainer is ultimately removed before serving the cooked bird.

As briefly noted above, certain steps in the processing of turkey and other poultry may result in the trussed bird striking processing elements or being struck thereby, and such blows may occur to the trussed legs as, for example, at the hocks thereof. Any such blow will have a tendency to force one of the legs inwardly of the other leg toward the body of the bird and this can cause one of the turkey legs to become unseated from the retainer. The present invention, however, prevents this possibility by means of the central locking member 26 seated behind the hocks of the turkey legs at the juncture of the separate hocks, again as illustrated in FIG. 3. The substantial inflexibility of this central locking member prevents same from giving or bending under conditions wherein the turkey hocks may receive a blow directed inwardly of the rear end of the turkey. Consequently the hocks 56 and 57 are firmly locked and maintained in retained position despite blows that may strike the hocks, for example. Intentional removal of the retainer hereof, may be accomplished by lifting the retainer by means of the upper loop 21 to resiliently extend legs and bridle portions of the retainer so that the central locking member 26 may be lifted over the hocks, and the bridle moved rearwardly of the turkey body to disengage the retainer from the hocks of the legs. It is only by resiliently drawing the retainer upwardly from the hocks, that it is possible to disengage the retainer from the hocks and turkey legs. The types of blows that the trussed turkey may receive cannot unseat the retainer hereof. Thus the retainer of the present invention provides a materially improvement over prior art retainers.

Although the present invention has been described above with respect to single a preferred embodiment thereof, it will be apparent to those skilled in the art that modifications and variations may be made within the scope of the present invention and thus it is not intended limit the invention to the precise terms of desription or details of illustrations.

What is claimed is:

1. An improved poultry leg retainer comprising
   a bridle of resiliently flexible strips including upper and lower strips and being adapted to fit over and about the hocks of poultry,
   said bridle including a central substantially inflexible locking member extending between said upper and lower strips and having side edges adapted to bear against the back sides of adjacent hocks of poultry and to extend therebetween, and
   anchor means having upturned ends adapted to fit into kidney holes of poultry and connected by legs in depending relation to said bridle.

2. The retainer of claim 1 further defined by said locking member having a V-shape for fitting tightly between hocks of poultry.

3. The retainer of claim 1 further defined by said locking member having a pair of upper arms curving outwardly and upwardly to said upper strip from connection to said lower strip.

4. The retainer of claim 1 further defined by
   said bridle including side strips extending between said upper and lower strips at the ends thereof for extension about the hocks of two poultry legs to resiliently hold same together in side-by-side relation and a pair of curved strips extending between said upper and lower strips between said side strips for disposition in creases in said hocks, and
   said locking means being disposed between said curved strips in extension between said upper and lower strips and dimensioned to engage said two poultry legs behind the hocks thereof to lock said hocks in said retainer despite forces applied to said hocks.

5. The retainer of claim 1 further defined by said retainer being integrally formed of nylon and including an integral ring extending above said upper strip and having a rigid portion across the top thereof for lifting of the retainer for attachment to and removal from engagement with said hocks of poultry.

6. The retainer of claim 1 further defined by said anchor means including a transverse rigid beam and said legs each including a rigid lower portion extending upwardly and inwardly from said beam adjacent the upturned ends of said anchor means.

7. The retainer of claim 1 further defined by said locking means having the sides thereof curving inwardly and downwardly from said upper strip into a leg strip extending to said lower strip for fitting tightly behind the locks of poultry held together by said bridle.

* * * * *